United States Patent [19]

Thorengaard et al.

[11] Patent Number: 4,990,280

[45] Date of Patent: Feb. 5, 1991

[54] PHOTOACTIVATOR DYE COMPOSITION FOR DETERGENT USE

[75] Inventors: Bitten Thorengaard, Charlottenlund, Denmark; David W. York, Waterloo, Belgium

[73] Assignees: Danochemo A/S, Ballerup, Denmark; The Proctor & Gamble Co., Cincinnati, Ohio

[21] Appl. No.: 322,636

[22] Filed: Mar. 13, 1989

[30] Foreign Application Priority Data

Mar. 14, 1988 [GB] United Kingdom ................. 8806016

[51] Int. Cl.[5] ........................ C11D 3/40; C11D 3/395; B01J 13/04

[52] U.S. Cl. ........................................ 252/95; 252/94; 252/174.13; 252/315.1; 252/315.3; 8/103; 427/213.3; 427/213.35; 428/403

[58] Field of Search ...................... 252/94, 95, 90, 174, 252/315.1, 315.3, 174.13; 8/103, 107; 428/403; 427/213.3, 213.35

[56] References Cited

U.S. PATENT DOCUMENTS

| | | | |
|---|---|---|---|
| 3,927,967 | 12/1957 | Speakman | 8/103 |
| 4,033,718 | 7/1977 | Holcombe et al. | 8/103 |
| 4,417,994 | 11/1983 | Stoddart | 252/135 |
| 4,548,610 | 10/1985 | Preiswerk et al. | 8/101 |
| 4,552,562 | 12/1985 | Preiswerk et al. | 8/101 |

*Primary Examiner*—Prince E. Willis
*Attorney, Agent, or Firm*—Watson, Cole, Grindle & Watson

[57] ABSTRACT

A photoactivator dye composition includes microcapsules of a solid dispersion of a water-soluble photoactivator dye in an encapsulating material that is quickly soluble in water. In a method of preparing such a photoactivator dye composition, the photoactivator dye is dissolved in an aqueous medium, the solution thus obtained is mixed with an aqueous solution of the encapsulating material, the mixture thus obtained is converted into droplets, and the moisture content of these droplets is reduced to form a solid solution. The photoactivator dye composition may advantageously be used in a detergent composition which additionally includes a surfactant and conventional detergent ingredients.

19 Claims, No Drawings

PHOTOACTIVATOR DYE COMPOSITION FOR DETERGENT USE

TECHNICAL FIELD

This invention relates to a photoactivator dye composition which is particularly suitable for detergent use, a method for preparing such a photoactivator composition and a detergent composition comprising the same.

BACKGROUND OF THE INVENTION

U.S. Pat. No. 3,927,967 discloses the use of photoactivator dyes like phtalocyanine dyes for use in detergents. Such photoactivator dyes are capable of absorbing electromagnetic radiation in the visible light range and releasing the absorbed energy quanta in a form that provides bleaching action on fabrics. It is believed that the energy quanta form singlet oxygen which is oxidatively active. Some photoactivators, like zinc phtalocyanine sulfonate (ZPS) and aluminium phtalocyanine sulfonate (APS), have found commercial application in granular detergent compositions.

However, when used in detergent compositions the phtalocyanine dyes present certain drawbacks that have heretofore not properly been addressed. One such drawback is that the particles in which the dyes are incorporated do not dissolve sufficiently quickly when contacted with water to avoid dye staining. Such contact is particularly likely to occur in endwise situations and even when the detergent composition containing the dye is dispensed from the machine dispenser of a typical European washing machine.

It has been attempted to spray a solution of the dye onto spray-dried detergent granules, but it has been found that the granules thus treated do not dissolve quickly enough to avoid dye staining of the fabric. The current trend is towards higher density detergent granules which are even less suitable carriers for the dye.

The best route of photoactivator dye addition available to date comprises spraying a dye solution onto low density granules that are subsequently dry mixed with the base granules of the detergent composition. Although these low density granules dissolve more quickly than the base granules they do not dissolve quickly enough to prevent dye staining of fabrics under various laundering conditions.

SUMMARY OF THE INVENTION

The present invention relates to phtalocyanine dyes for detergent use, characterized in that the dyes are encapsulated in an encapsulating material that quickly dissolves in cold water. Preferably, the encapsulating material does not dissolve in nonionic surfactant.

Preferred phtalocyanine dyes are zinc phtalocyanine sulfonate (ZPS) and aluminium phtalocyanine sulfonate (APS).

Preferred encapsulating materials include gelatine, particularly low bloom gelatines, and mixtures of gelatine and sugar.

The present invention also relates to a method for preparing encapsulated photoactivator compositions, comprising the steps of 1. dissolving the photoactivator dye in an aqueous medium,
2. mixing the photoactivator dye solution in an aqueous solution of the encapsulating material,
3. converting the mixture then obtained into droplets of an average size not exceeding 500 micrometers,
4. reducing the moisture content of the particles to a value of between 2% and 12% by weight.

The invention further relates to granular detergent compositions containing the encapsulated phtalocyanine dyes.

DETAILED DESCRIPTION OF THE INVENTION

The photoactivator dye composition according to the invention comprises micro capsules of a solid solution of a water soluble photoactivator dye (solute) in an encapsulating material (solvent) that is quickly soluble in cold water, these microcapsules comprising by weight of the capsules, (a) from 1% to 60% of the photoactivator dye, preferably from 1% to 40%, (b) from 38% to 97% of the encapsulating material, and (c) from 2% to 12% water, preferably from 2% to 5%.

The term "microcapsules" means capsules having an average particle size not exceeding 500 micrometers and preferably an average particle size range of from 50 micrometers to 450 micrometers.

In order to evaluate a material's capability to quickly solubilize in cold water, the following experiment can be performed.

A Sotax AT6 dissolution apparatus is used, in which the stirring speed is set af 150 rpm, using the paddle stirrer bars. 1,000 mls of ph 9.5 buffer is poured into each polycarbonate beaker, and maintained at 20° C. 0.05 g of material is added to the buffer solution. While stirring under the specified conditions, 3 ml aliquots of the solution are withdrawn at 15 seconds intervals for 2 minutes; the absorbance of each of the aliquots is measured at 669 nm. According to this experiment, suitable materials have the following dissolution profile:

$\geqq$80% dissolved at 30 seconds,
$\geqq$95% dissolved at 60 seconds,
100% dissolved at 120 seconds.

Preferably, the encapsulating material of the photoactivator dye composition does not dissolve in nonionic surfactants. Indeed, modern detergent compositions almost invariably contain nonionic surfactants, typically at levels of from 1% to 12%. In most cases this nonionic surfactant is sprayed onto the base granules of the detergent composition. During storage the nonionic detergent freely migrates through the bulk of the detergent composition, particularly if the nonionic surfactant is liquid at the temperature of storage.

Since phtalocyanine dyes are highly soluble in nonionic surfactants, these dyes migrate as well and become absorbed to the base granules rather than to the low density granules. The appearance of the detergent composition becomes rather unattractive as a result. Moreover, the dissolution of the dye becomes associated with the dissolution of the base granules rather than with the much faster dissolution of the low density granules.

The insolubility of the encapsulating materials in nonionic surfactant, as required herein, can be evaluated in the following expirement:

0.05 g of the encapsulating material is added to 50 ml Dobanol 45 $E_7$ at 40° C. (Dobanol 45 $E_7$ is an alkyl alcohol ethylene oxide condensate; it is predominantly linear $C_{14}/C_{15}$ primary alcohol with an average of 7 ethylene oxide groups).

The temperature is maintained at 40° C. for 1 hour. The dissolution is measured by the absorbance at 669 nm and, according to this measure, there should be no sign of dissolution after 1 hour.

Examples of suitable water soluble photoactivators include eosin, rose bengal, fluorescin, chlorophyll, metal-free porphyrin and polyvalent metal ion complexes of sulfonated phtalocyanine, especially when free of unsulfonated phtalocyanine.

Suitable examples of polyvalent metal ions include $Zn^{2+}$, $Al^{3+}$, $Mn^{2+}$, etc. Preferred photoactivator dyes are zinc phtalocyanine sulfonate (ZPS) and aluminium phtalocyanine sulfonate (APS). These dyes are commercially available as the sodium salts.

In a preferred embodiment the microcapsules comprise from 5% to 30% by weight of the photoactivator dye.

Examples of suitable encapsulating materials include gelatine, hydrolyzed gelatine, film-forming carbohydrates. Preferred encapsulating materials are hydrolyzed gelatine, and film-forming carbohydrates including dextrin and gum Arabic.

The photoactivator dye composition described above can be prepared by a method comprising:

(1) dissolving the photoactivator dye in an aqueous medium, (2) mixing the photoactivator dye solution with an aqueous solution of the encapsulating material, (3) converting the mixture thus obtained into droplets of an average particle size not exceeding 500 micrometer, and (4) reducing the moisture content of the particles to a value of between 2% and 12% by weight to form a solid solution of the photoactivator dye in the encapsulating material.

The encapsulating material should preferably have a molecular weight which is substantially higher than that of the photoactivator dye. Thus, if the size of the molecules of the photoactivator dye is less than about 0.6 of that of the encapsulating material, an extensive interstitial solid solution, i.e., a solid solution in which the solute molecules occupy the interstitial space of the solvent lattice is obtained.

The formation of such an interstitial solid solution appears to substantially contribute to a quick release of the photoactivator dye in a finely dispersed form when the capsules are contacted with water.

The conversion of the mixture into droplets and the reduction of the moisture content of the droplets are preferably effected by a spray-drying technique.

In a preferred embodiment of the method of the invention the mixture is spray-dried at an elevated temperature of below 100° C. while introducing a fine powder into the spray drying zone, as explained in U.S. Pat. No. 2,756,177. The fine powder can be silicate or, preferably, finely divided corn starch.

In another preferred embodiment the mixture is spray-dried at a temperature of above 100° C.

In a preferred embodiment saccharose of glucose sirup can be added to the mixture to be spray-dried in order to lower the viscosity of the mixture, the weight ratio of encapsulating material to sugar being at least 35:65, preferably 50:50.

Preferably an oil such as coconut oil is incorporated in the mixture to be spray-dried in the form of an emulsion. The presence of the oil facilitates the formation of droplets when the mixture is spray-dried, and amounts of from 3% to 20% by weight, preferably 5% to 10% by weight can be used; the most preferred amount of oil is 5% by weight.

The dry matter content of the mixture to be spray-dried may vary within wide ranges, but the viscosity is preferably maintained within the range of from 70 cp to 200 cp at 60° C.

The detergent composition according to the invention preferably contains the photoactivator dye composition described above in an amount of from 2 ppm to 1,000 ppm of the pure photoactivator dye by weight of the detergent composition.

The detergent composition further contains typical detergent ingredients, e.g., organic surfactants, detergent builders, conventional detergent adjuncts, etc.

Preferred detergent compositions are those containing from 1% to 12%, preferably from 3% to 10%, of a nonionic surfactant.

The preferred nonionic surfactant preferably comprises a mixture of alkoxylated alcohols of the formula R(R'O)xOH, wherein R is hydrocarbyl containing from 12 to 20 carbon atoms, R'O represents an alkoxy group, preferably an ethoxy group and x ranges from 4 to 12.

The invention will now be described in further detail with reference to the following examples.

EXAMPLES

EXAMPLE 1

3,240 g gelatine (Bloom strength 0) and 3,240 g sugar were added to a solution of 1,300 g zinc phtalocyanine sulfonate in 5,200 g water while stirring. 650 g coconut oil were emulsified in the solution thus obtained.

The dry matter content of the mixture thus prepared was about 60%, about 16% being zinc phtalocyanine sulfonate and the viscosity was 96 cp at 55° C.

The mixture was spray-dried in a spray drying tower while simultaneously introducing corn starch therein as a powdering composition.

The mixture was introduced at a rate of 2 l/min. and the temperature of the spray drying zone was about 70° C.

The final product (about 9,200 g) was sieved and the mesh 30—mesh 120 (ASTM) fraction was collected and analyzed. The collected fraction contained 14.1% zinc phtalocyanine sulfonate and the average particle diameter was about 350 micrometer.

EXAMPLE 2

2,388 g gelatine was dissolved in 2,135 g water by stirring and heating to a temperature of about 60° C. A solution of 126 g sodium hydroxide in 215 g water was added under stirring to the gelatine solution at a temperature of 60° C. After stirring for 20 min. at 60° C. 135 g concentrated sulfuric acid (96%) was added and the pH-value was adjusted at about 5.5. 900 g of the solution thus obtained (hydrolyzed gelatine) was mixed with a solution of 100 g zinc phtalocyanine sulphonate in 1150 g water, 450 g spray-dried glucose syrup (MOR-SWEET® 1924) and 50 g coconut oil while stirring at 55° C. When the coconut had been emulsified in the aqueous medium an additional amount of 700 g water was added. The dry matter content of the mixture thus obtained was about 30%, about 10% being zinc phtalocyanine sulfonate. The viscosity of the mixture was about 50 cp at 60° C. The mixture was spray-dried in a conventional spray-drying tower at an inlet temperature of 240° C. and an outlet temperature of 97° C.

The spray-dried product (about 900 g) was sieved and the sieve fraction having a particle size of less than 100 mesh (ASTM) was collected.

This fraction contained 9.7% zinc phtalocyanine sulfonate and the average particle size was about 50 micrometer.

EXAMPLE 3

A granular detergent composition was prepared, having the following composition:

| Ingredient | % |
|---|---|
| tallow alkyl sulfate | 2.4 |
| linear alkyl benzene sulfonate | 5.6 |
| polymer | 2.0 |
| silicate | 8.0 |
| sodium tripolyphosphate | 21.0 |
| sodium perborate | 15.0 |
| nonionic (DOBANOL ® $45E_7$) | 5.0 |
| enzyme (protease) | 0.8 |
| TAED | 2.0 |
| zinc phtalocyanine sulfonate* | 0.03 |
| minor (optical brightener, chelants, CMC, perfume, suds suppressor); inorganic salts (sodium sulfate, sodium carbonate, magnesium sulfate); and water. | BALANCE |

(*as encapsulates in zero-bloom gelatine. ZPS content of capsules 3.4%. Particle size of the capsules 150–450 micrometers; 0.88% was added, to result in a ZPS level in the detergent composition of 0.03.)

EXAMPLE 4

1060 g gum Arabic and 1010 g sugar were added to a solution of 1375 g zinc phtalocyanine sulfonate in 1850 g water while stirring. 138 g coconut oil was emulsified in the solution thus obtained.

The dry matter content of the mixture thus prepared was about 45%, about 11.4% being zinc phtalocyanine sulfonate and the viscosity was 108 cp at 57° C.

The mixture was spray-dried in a spray-drying tower while simultaneously introducing corn starch therein as a powdering composition.

The mixture was introduced at a rate of 1.5 /min. and the temperature of the spray-drying zone was about 65° C.

The final product (about 3500 g) was sieved and the mesh 30 —mesh 170 (ASTM) fraction was collected and analyzed.

The collected fraction contained 8.2% zinc phtalocyanine sulfonate and the average particle diameter was about 250 micrometer.

EXAMPLE 5

1060 g gelatine (Bloom strength 0) and 1010 g sugar were added to a solution of 1250 g sulphonated aluminium tetrabenzotetraazaporphine in 850 g water while stirring. 138 g coconut oil was emulsified in the solution thus obtained.

The dry matter content of the mixture thus prepared was about 53%, about 6.3% being aluminium tetrabenzotetraazaporphine and the viscosity was 106 cp at 58° C.

The mixture was spray-dried in a spray-drying tower while simultaneously introducing corn starch therein as a powdering composition.

The mixture was introduced at a rate of 1.5 l/min. and the temperature of the spray-drying zone was about 70° C.

The final product (about 2800 g) was sieved and the mesh 30 —mesh 170 (ASTM) fraction was collected and analyzed. The collected fraction contains 5.2% aluminium tetrabenzotetraazaporphine.

EXAMPLE 6

1060 g gum Arabic and 1010 g spray-dried glucose syrup (MOR-SWEET ® 1924) were added to a solution of 1250 g sulphonated aluminium tetrabenzotetraazaporphine in 2350 g water while stirring. 138 g coconut oil was emulsified in the solution thus obtained.

The dry matter content of the mixture thus prepared was about 40%, about 6.3% being aluminium tetrabenzotetraazaporphine and the viscosity was 104 cp at 58° C.

The mixture was spray-dried in a spray-drying tower while simultaneously introducing corn starch therein as a powdering composition.

The mixture was introduced at a rate of 1.5 l/min. and the temperature of the spray-drying zone was about 70° C.

The final product (about 3100 g) was seived and the mesh 30 —mesh 170 (ASTM) fraction was collected and analyzed. The collected fraction contained 4.2% of aluminium tetrabenzotetraazaporphine.

What is claimed is:

1. A photoactivator dye composition comprising microcapsules of a solid dispersion of a water-soluble photoactivator dye in an encapsulating material that is quickly soluble in water, said microcapsules comprising, by weight of the capsules, (a) from 1% to 60% of the photoactivator dye, (b) from 38% to 97% of an encapsulating material selected from the group consisting of gelatine, hydrolyzed gelatine and film-forming carbohydrates, and (c) from 2% to 12% water.

2. A composition as in claim 1, wherein the encapsulating material is insoluble in nonionic surfactants.

3. A composition as in claim 1, comprising microcapsules having an average particle size range of from 50 micrometers to 450 micrometers.

4. A composition as in claim 1, wherein the photoactivator dye is a polyvalent metal ion complex of sulfonated phthalocyanine.

5. A composition as in claim 4, wherein the photoactivator dye is at least one sulfonate selected from the group consisting of zinc phthalocyanine sulfonate and aluminium phthalocyanine sulfonate.

6. A composition as in claim 1, wherein the encapsulating material is selected from the group consisting of hydrolyzed gelatine and film-forming carbohydrates.

7. A composition as in claim 6, wherein said encapsulating material is a film-forming carbohydrate selected from the group consisting of dextrin and gum Arabic.

8. A composition as in claim 1, wherein the microcapsules comprise from 1 to 40% by weight of the photoactivator dye.

9. A composition as in claim 1, which further contains saccharose or glucose syrup, the weight ratio of encapsulating material to sugar being at least 35:65.

10. A composition as in claim 9, wherein the weight ratio of encapsulating material to sugar is 50:50.

11. A detergent composition which comprises 2 ppm to 1,000 ppm, based on the total weight of the detergent composition, of a photoactivator dye composition that comprises microcapsules of a solid dispersion of a water-soluble photoactivator dye in an encapsulating material that is quickly soluble in water, said microcapsules comprising, by weight of the capsules, (a) from 1% to 60% of the photoactivator dye, (b) from 38% to 97% of an encapsulating material selected from the group consisting of gelatine, hydrolyzed gelatine and film-forming carbohydrates, and (c) from 2% to 12% water.

12. A detergent composition as in claim 11 which comprises from 1% to 12% of a nonionic surfactant.

13. A detergent composition as in claim 12, wherein the nonionic surfactant comprises a mixture of alkoxylated alcohols of the formula R(R'O)xOH, wherein R is hydrocarbyl having from 12 to 20 carbon atoms, R'O represents an alkoxy group and x ranges from 4 to 12.

14. A method of preparing a photoactivator composition which comprises microcapsules of a solid dispersion of a water-soluble photoactivator dye in an encapsulating material that is quickly soluble in water, said microcapsules comprising, by weight thereof, of 1 to 60% of photoactivator dye, 38–97% encapsulating material selected from the group consisting of gelatine, hydrolyzed gelatine and film-forming carbohydrates, and 2 to 12% water, comprising the steps of (1) dissolving the photoactivator dye in an aqueous medium, (2) mixing the photoactivator dye solution with an aqueous solution of the encapsulating material, (3) converting the mixture thus obtained into droplets of an average particle size not exceeding 500 micrometers, and (4) reducing the moisture content of said particles to a value of between 2% and 12% by weight to form a solid solution of the photoactivator dye in the encapsulating material.

15. A method as in claim 14, wherein the conversion of the mixture into droplets and reducing the moisture content of said droplets is effected by spray-drying.

16. A method as in claim 15, wherein the spray-drying is effected at a temperature of below 100° C. while introducing a fine powder into the spray-drying zone.

17. A method as in claim 15, wherein the spray-drying is effected at a temperature of above 100° C.

18. A method as in claim 14, wherein saccharose or glucose is added to the mixture of the photoactivator dye and encapsulating material.

19. A method as in claim 14, wherein an oil is emulsified in the mixture of the photoactivator dye and encapsulating material.

* * * * *

UNITED STATES PATENT AND TRADEMARK OFFICE

CERTIFICATE OF CORRECTION

PATENT NO. : 4,990,280

DATED : February 5, 1991

INVENTOR(S) : Bitten Thorengaard et al

It is certified that error appears in the above-identified patent and that said Letters Patent is hereby corrected as shown below:

In column 1, lines 14, 21, 22, 25, 51, 56 (both occurrences) and 57 replace "phtalocyanine" with --phthalocyanine--.

In column 2, lines 7 and 53, replace "phtalocyanine" with --phthalocyanine--.

In column 3, lines 8, 9, 12, and 13, replace "phtalocyanine" with --phthalocyanine--.

In column 5, lines 4, 20, 32, 36 and 48, replace "htalocyanine" with --phthalocyanine--.

Signed and Sealed this

Seventeenth Day of November, 1992

*Attest:*

DOUGLAS B. COMER

*Attesting Officer*

*Acting Commissioner of Patents and Trademarks*